(12) United States Patent
Jeon et al.

(10) Patent No.: US 9,461,717 B2
(45) Date of Patent: Oct. 4, 2016

(54) METHOD FOR COOPERATIVE MULTI-ANTENNA COMMUNICATION

(75) Inventors: Sang-Woon Jeon, Dajeon (KR); Sae-Young Chung, Daejeon (KR); Jong-Bu Lim, Pohang-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1513 days.

(21) Appl. No.: 12/264,337

(22) Filed: Nov. 4, 2008

(65) Prior Publication Data

US 2009/0323643 A1   Dec. 31, 2009

(30) Foreign Application Priority Data

Jun. 27, 2008   (KR) .................. 10-2008-0061686

(51) Int. Cl.
*H04B 7/02* (2006.01)
*H04B 7/155* (2006.01)

(52) U.S. Cl.
CPC .......... *H04B 7/024* (2013.01); *H04B 7/15592* (2013.01)

(58) Field of Classification Search
None
See application file for complete search history.

(56) References Cited

U.S. PATENT DOCUMENTS

| | | |
|---|---|---|
| 6,665,521 B1 | 12/2003 | Gorday et al. |
| 6,785,513 B1 | 8/2004 | Sivaprakasam |
| 2002/0102950 A1 | 8/2002 | Gore et al. |
| 2003/0190897 A1 | 10/2003 | Lei et al. |
| 2005/0243756 A1* | 11/2005 | Cleveland et al. ........... 370/328 |
| 2007/0010196 A1 | 1/2007 | Periyalwar et al. |
| 2008/0014884 A1* | 1/2008 | Oyman et al. ............. 455/187.1 |
| 2008/0285500 A1* | 11/2008 | Zhang et al. ................. 370/315 |

FOREIGN PATENT DOCUMENTS

| | | |
|---|---|---|
| JP | 2007-531382 JP | 11/2007 |
| JP | 2008/85871 | 4/2008 |
| KR | 10-2006-0111238 A | 10/2006 |
| KR | 10-2007-0055313 A | 5/2007 |
| VA | 10-2006-0132149 A | 12/2006 |
| WO | WO 03/003672 A2 | 1/2003 |
| WO | WO-2006-063138 A2 | 6/2006 |

OTHER PUBLICATIONS

Japanese Office Action issued Feb. 12, 2013 in counterpart Japanese Patent Application No. 2011-516098 (3 pages, in Japanese).
Extended European Search Report issued by the European Patent Office on Feb. 6, 2014 in the corresponding EP Patent Application No. 08874812.4.

* cited by examiner

*Primary Examiner* — Chirag Shah
*Assistant Examiner* — Srinivasa Reddivalam
(74) *Attorney, Agent, or Firm* — NSIP Law

(57) ABSTRACT

A method of cooperative multi-antenna communication between a base station and node existing in a wireless network is provided. A cooperative multi-antenna communication method includes receiving data from at least one node of a node group that receives data from a base station, performing multiple input multiple output (MIMO) signal processing with respect to the received data, the MIMO signal processing indicating signal processing performed in a receiving end of a MIMO system, and transmitting the signal processed data to at least one target node.

27 Claims, 9 Drawing Sheets

METHOD FOR COOPERATIVE MULTI-ANTENNA COMMUNICATION

CROSS-REFERENCE TO RELATED APPLICATIONS

This application claims the benefit under 35 U.S.C. §119(a) of a Korean Patent Application No. 10-2008-0061686, filed on Jun. 27, 2008 in the Korean Intellectual Property Office, the disclosures of which is incorporated herein by reference in its entirety.

TECHNICAL FIELD

The following description relates to a multi-user multi input multi output (MIMO) communication, and more particularly to, a method of cooperative multi-antenna communication between a base station and node existing in a wireless network.

BACKGROUND

A number of researches have been conducted to eliminate interference from occurring in a wireless communication system. For example, researches to eliminate intra-cell interference and inter-cell interference between cells have been conducted to improve communication quality. However, although communication quality with respect to the whole cell may be improved by eliminating the intra-cell interference and inter-cell interference, communication quality of a user in an edge of the cell may not equal that of a user in a center of the cell even with eliminating those interferences, since a data transmission rate of the user in the edge of the cell may be lower than that of the user in the center of the cell.

To improve the data transmission rate of the user in the edge of the cell, improving a cell capacity may be required. A multi input multi output (MIMO) communication method has been the focus of attention as a core technology to improve the cell capacity. To improve the cell capacity through the MIMO communication method, establishing a plurality of antennas in a base station may be required. However, establishing a plurality of antennas in a terminal may be limited by space and cost. As such, a multi-user MIMO communication system has been proposed where the number of antennas in a base station is greater than the number of antennas in a terminal. In the multi-user MIMO communication system, a transmitting end may be required to be aware of channel information of each receiving end. However, the transmitting end may not obtain channel information of every receiving end due to a characteristic of a time-varying channel and overhead caused by a channel feedback.

As an example, where a transmitting end considers many antennas, the number of terminals that may be simultaneously supported increases. In this case, since it may be impractical that the transmitting end receives complete channel information feedback of every receiving end. Accordingly, there is a need for an improved multi-antenna technology, for example, a multi-antenna technology where a transmitting end may not require channel information feedback of a receiving end.

SUMMARY

In one general aspect, there is provided a node in a cooperative multi-antenna communication system, which receives data transmitted from a base station, performs multiple input multiple output (MIMO) signal processing with respect to the received data, the MIMO signal processing indicating signal processing performed in a receiving end of a MIMO system, and transmits the MIMO signal processed data to a target node.

A cooperative multi-antenna communication may be provided without requiring channel feedback and enlargement of cell capacity in proportion to the number of antennas in the base station.

In another general aspect, a method of cooperative multi-antenna communication comprises receiving data from at least one node of a node group that receives data from a base station, performing Multiple Input Multiple Output (MIMO) signal processing with respect to the received data, the MIMO signal processing indicating signal processing performed in a receiving end of a MIMO system, and transmitting the signal processed data to at least one target node.

The transmitting may comprise transmitting the signal processed data to the at least one target node in a time division multiple access (TDMA) mode where the at least one target node to receive the signal processed data exists.

The receiving may comprise receiving the data in a TDMA mode from the at least one node of the node group that receives the data from the base station in a wireless network.

The base station may transmit the data to at least one node group in a wireless network in a TDMA mode.

The wireless network may be a cellular-based communication system and the node group be a grouping of at least one node located in an edge of a cell.

The wireless network may be a cellular-based communication system and the node group may be a grouping of at least one node located in a boundary between a cell where the base station belongs and a neighboring cell.

The node group may receive the data from the base station and a second base station located in the neighboring cell.

The number of nodes composing the node group may be determined according to a number of antennas in the base station.

The number of the nodes composing the node group may be determined according to a number of antennas in the base station and the second base station.

The base station may classify a single time slot into a first time slot and a second time slot and transmit the data to the node group using the first time slot, and nodes composing the node group may transmit/receive the data using the second time slot.

In still another general aspect, a method of cooperative multi-antenna communication comprises receiving data from a base station, encoding the received data, and transmitting the encoded data to a data collecting node existing in the node group, wherein the data collecting node receives the encoded data from at least one node existing in the node group, performs MIMO signal processing with respect to the encoded data, the MIMO signal processing indicating signal processing performed in a receiving end of a MIMO system, and transmits the MIMO signal processed data to at least one target node. The data collecting node may transmit the MIMO signal processed data to at least one target node in a TDMA mode where the at least one target node to receive the MIMO signal processed data exists in the node group.

The receiving may comprise receiving the data from base station in a wireless network in a TDMA mode.

The base station may transmit the data to at least one node group existing in the wireless network in a TDMA mode.

The method may further comprise generating the node group with the at least one node in the wireless network, wherein the wireless network may be a cellular-based communication system and the generating of the node group may comprise generating the node group with the at least one node located in an edge of a cell.

The method may further comprise generating the node group with the at least one node in the wireless network, wherein the wireless network may be a cellular-based communication system, and the generating of the node group may comprise generating the node group with the at least one node located in a boundary between a cell where the base station belongs and a neighboring cell.

The received of the data from the base station may comprise receiving the data from the base station and a second base station located in the neighboring cell.

The number of nodes composing the node group may be determined according to a number of antennas in the base station.

The number of nodes composing the node group may be determined according to a number of antennas in the base station and the second base station.

The base station may classify a single time slot into a first time slot and a second time slot and transmit the data to the node group using the first time slot, and nodes composing the node group may transmit/receive the signal processed data using the second time slot.

In still another general aspect, a method of cooperative multi-antenna communication comprises generating a node group with at least one node in a wireless network, receiving data from a base station, and performing signal processing with respect to the received data and transmitting the signal processed data to a data collecting node existing in the node group in a TDMA mode, wherein the data collecting node receives the signal processed data from at least one node existing in the node group, performs MIMO signal processing with respect to the received data, the MIMO signal processing indicating signal processing performed in a receiving end of a MIMO system, and transmits the MIMO signal processed data to at least one target node in the TDMA mode.

The data collecting node may transmit the MIMO signal processed data to at least one target node in a TDMA mode where the at least one target node to receive the MIMO signal processed data exists in the node group.

In still another general aspect, a method of cooperative multi-antenna communication comprises generating at least one node group using at least one node existing in a wireless network, and transmitting data to the at least one node group in a TDMA mode, wherein the at least one node in the at least one node group transmits the data to a data collecting node of each node group in the TDMA mode, and the data collecting node performs MIMO signal processing with respect to the received data, the MIMO signal processing indicating signal processing performed in a receiving end of a MIMO system, and transmits the MIMO signal processed data to at least one target node.

The data collecting node may transmit the MIMO signal processed data to at least one target node in the TDMA mode where the at least one target node to receive the MIMO signal processed data exists in the node group.

The wireless network may be a cellular-based communication system, and the generating of the at least one node group may comprise generating the at least one node group using the at least one node located in an edge of a cell.

The generating of the at least one node group may comprise determining a number of nodes to be included in the at least one node group according to a number of antennas of the base station.

The transmitting of the data in the TDMA mode may comprise transmitting the data to the at least one node group using a first time slot after classifying a single time slot into the first time slot and a second time slot, and nodes included in the at least one node group may transmit/receive the data using the second time slot.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness FIG. 1 illustrates a wireless network according to an exemplary embodiment.

Figure 1:
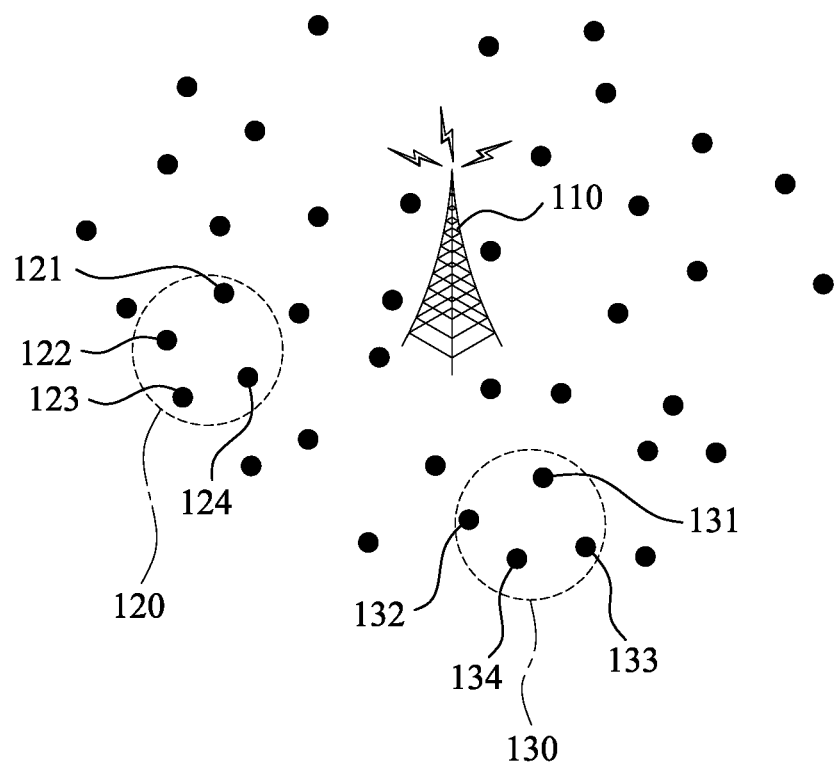
FIG. 1 is a diagram illustrating a wireless network according to an exemplary embodiment.

As illustrated in FIG. 1, the wireless network includes a base station 110, a node group (1) 120 comprising at least one node 121, 122, 123 and 124, and a node group (2) 130 comprising at least one node 131, 132, 133, and 134. The base station 110 may select at least one node to be included in each of the node groups (1 and 2) 120 and 130 from nodes existing in a wireless network to generate the node groups (1 and 2) 120 and 130. A number of nodes to be included in the node groups may be determined according to a number of antennas of the base station 110. Then, the base station 110 may transmit data to the generated node groups (1 and 2) 120 and 130. Since the number of nodes in the node groups may be determined according to the number of antenna of the base station 110, where the number of antennas of the base station 110 is m, m×m of MIMO channels may be generated. Although the number of nodes in the node groups is determined as four in FIG. 1, the number of nodes is not limited thereto.

The base station 110 may transmit the data to the node groups (1 and 2) 120 and 130 in a time division multiple access (TDMA) mode. For example, the base station 110 may transmit the data based on 2-TDMA in FIG. 1. In this case, where it is assumed that each time slot is k and k+1, the base station 110 may transmit the data to node group (1) 120 in a k slot and may transmit the data to node group (2) 130 in a k+1 slot.

Subsequently, the node group (1) 120 and node group (2) 130 may respectively determine its data collecting node. Here, it is assumed that the node group (1) 120 has a data collecting node 122 and the node group (2) 130 has a data collecting node 134.

Thereafter, nodes 121, 123, 124, 131, 132, and 133 included in the node group (1) 120 and node group (2) 130 may quantize and encode the data received from the base station 110 and respectively transmit the encoded data to the data collecting nodes 122 and 134 in the TDMA mode.

The data collecting nodes 122 and 134 may perform MIMO signal processing with respect to the received data from the at least one node in each node group (1) 120 and (2) 130 and obtain data from which interference is eliminated for example, by using successive interference cancellation (SIC).

Where the node group (1) 120 and node group (2) 130 have a special signal reception node (hereinafter, a target node), excluding the data collecting nodes 122 and 134, that may receive data from which interference is eliminated through a MIMO signal processing, the data collecting nodes 122 and 134 may perform the MIMO signal processing with respect to the received data from the at least one node in each node group (1) 120 and (2) 130, the MIMO signal processing indicating signal processing performed in a receiving end of a MIMO system, and transmit the processed data to the target node in a TDMA mode.

As an illustration, operations are further described below with respect to the node group (1) 120. The node 121, node 123, and node 124 quantize and encode data received from the base station 110, and transmit the encoded data to a data collecting node 122 in a TDMA mode. In this case, a time slot, $3Q_1$ slot, is used. $Q_1$ is determined in the quantizing. Where it is assumed that $Q_1$ is 1, the nodes 121, 123, and 124 transmit the data to the data collecting node 122 through k+1, k+2, and k+3, respectively. Here, it starts from the k+1 slot, since the slot k may be used where the base station 110 transmits data to the node group (1) 120. Subsequently, the data collecting node 122 eliminates interference through a MIMO signal processing performed in a receiving end of a MIMO system with respect to the received data to obtain data that the data collecting node should receive. Where there is a target node (herein the target node is referred to as a node 121) to receive the data, excluding the data collecting node 122, the data collecting node 122 may perform the MIMO signal processing performed in the receiving end of the MIMO system with respect to the received data and transmit the signal processed data to the target node 121 using $Q_2$ slot. Where $Q_2$ is assumed to be 1, the data collecting node 122 transmits the processed data to the target node 121 in a k+4 slot. Accordingly, four time slots are used in total while the nodes 121, 122, 123, and 124 in the node group (1) 120 perform data processing and the processed data is transmitted to the target node 121 through transmitting/receiving.

The processed data may be generated by the data collecting nodes 122 and 134 that perform the MIMO signal processing with respect to the encoded data and obtain data from which interference is eliminated, for example, by using SIC.

An operation that the base station 110 transmits data to the node group (1) 120 and node group (2) 130 in a TDMA mode and an operation that the nodes respectively included in the node group (1) 120 and node group (2) 130 transmit/receive the data may be performed in parallel. That is, where the base station 110 transmits the data to the node group (1) 120 in a k slot, the nodes 121, 122, 123, and 124 in the node group (1) 120 may transmit/receive the data starting from a k+1 slot and, at the same time, the base station 110 transmits the data to nodes 131, 132, 133, and 134 in the node group (2) 130 using the k+1 slot. Subsequently, the nodes 131, 132, 133, and 134 in the node group (2) 130 may transmit/receive the data starting from a k+2 slot.

The base station 110 may classify a single time slot into a first time slot and a second time slot and transmit the data to the node groups (1 and 2) 120 and 130 using the first time slot, and the nodes in the node groups (1 and 2) 120 and 130 may transmit/receive the data using the second time slot. Accordingly, transmitting of the data to the node groups (1 and 2) 120 and 130 by the base station 110 and the transmitting/receiving of the data by the nodes included in the node groups (1 and 2) 120 and 130 may be performed in a different time. The length of the first time slot and the second time slot may be variously determined.

For example, the base station 110 may transmit data to the node group (1) 120 and node group (2) 130 using a k slot and k+1 slot, and the transmitting of the data may be performed using a first time slot of each slot. Also, the node groups 121, 123, and 124 in the node group (1) 120 may transmit the data to the data collecting node 122 using the k slot, the k+1 slot, and a k+2 slot, and the transmitting of the data may be performed using a second time slot of each slot (herein $Q_1$ is assumed to be 1). Subsequently, the data collecting node 122 may transmit the data to the target node 121 using a k+3 time slot, and the transmitting of the data may be performed using a second time slot of the k+3 time slot (herein $Q_2$ is assumed to be 1). Since the base station 110 transmits the data using the first time slot of the k+1 slot, the nodes 131, 132, 133, and 134 included in the node group (2) 130 may transmit/receive the data starting from the k+1 slot, and the transmitting/receiving of the data uses a second time slot of each slot.

The wireless network described herein may be a cellular-based communication system, ad-hoc network, sensor network, and the like.

Hereinafter, an exemplary embodiment as applied to a cellular-based communication system will be described.

Figure 2:
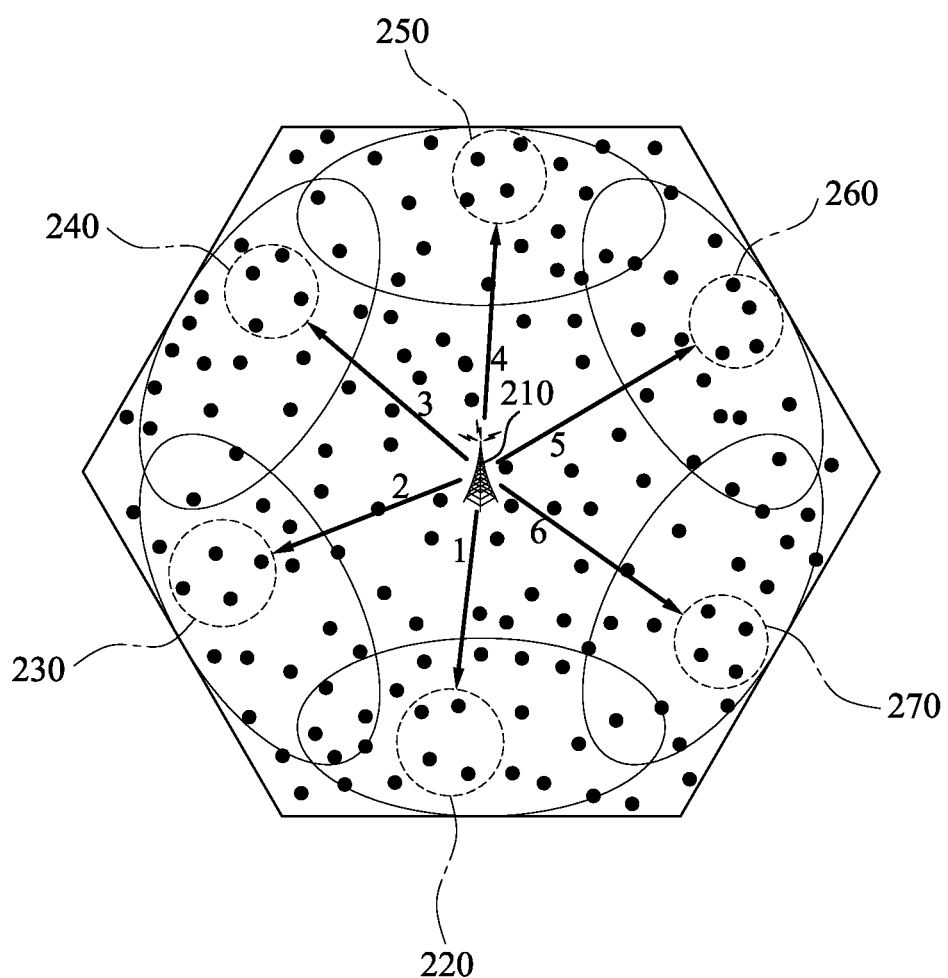
FIG. 2 is a diagram illustrating a base station transmitting data to at least one node group according to an exemplary embodiment.

FIG. 2 illustrates a base station transmitting data to at least one node group in a TDMA mode in a cellular-based communication system according to an exemplary embodiment. The base station 210 may generate a node group using at least one node located in an edge of a cell. Referring to FIG. 2, the edge of the cell is divided into six regions, and node groups (1 through 6) 220, 230, 240, 250, 260, and 270 comprising at least one node distributed in each region are illustrated.

The base station 210 transmits data to each of the node groups (1 through 6) 220, 230, 240, 250, 260, and 270 in a TDMA mode. In FIG. 2, since the edge of the cell is divided into the six regions and one node group exists in each region, the data may be transmitted to each of the node groups (1 through 6) 220, 230, 240, 250, 260, and 270 in a 6-TDMA mode. In FIG. 2, the base station 210 transmits the data to the node group (1) 220 using a k time slot, transmits the data to the node group (2) 230 in a k+1 time slot, transmits the data to the node group (3) 240 in a k+2 time slot, transmits the data to the node group (4) 250 in a k+3 time slot, transmits the data to the node group (5) 260 in a k+4 time slot, and transmits the data to the node group (6) 270 in a k-+5 time slot. Where the base station 210 transmits the data to the node group in the TDMA mode, the nodes included in the node group perform signal processing and data transmitting/receiving operation using the received data. The above operation is further described with reference to FIG. 3.

Figure 3:
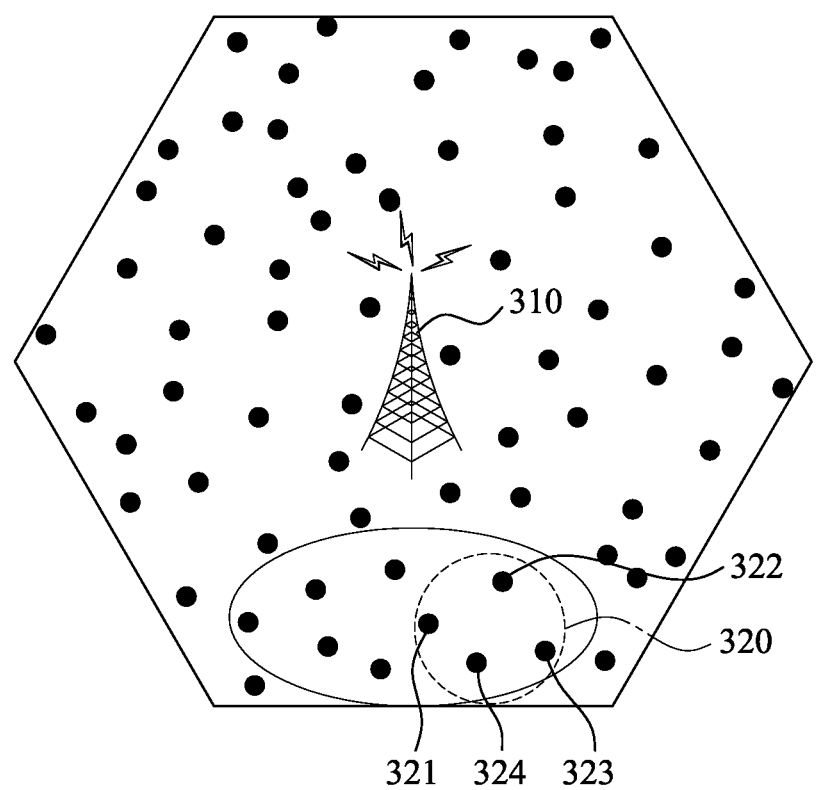
FIG. 3 is a diagram for illustrating operations of nodes in a node group according to an exemplary embodiment.

FIG. 3 illustrates operations of nodes in a node group in a cellular-based communication system according to an exemplary embodiment.

A number of nodes included in a node group 320 may be determined according to a number of antennas of a base station 310. In FIG. 3, since the number of antennas of the base station 310 is assumed to be four, the number of nodes in the node group 320 is determined as four.

Where the base station 310 transmits data to the node group 320 in a TDMA mode, at least one node in the node group 320 quantizes and encodes the data and transmits the encoded data to a data collecting node. In this case, where the number of nodes in the node group 320 is m, (m−1) $Q_1$ of slots are used. Also, $Q_1$ is determined in quantizing. Where it is assumed that a node 323 is a data collecting node among nodes 321, 322, 323, and 324 in the node group 320, the nodes 321, 322, and 324 quantize and encode the data received from the base station 310 and transmit the encoded data to the data collecting node 323 in the TDMA mode. Also, where it is assumed that $Q_1$ is 1 ($Q_1$=1), the time slots used where the nodes 321, 322, and 324 transmit the data to the data collecting node 323 are k+1, k+2, and k+3 (here, it is assumed that the slot k is used where the base station 110 transmits data to the node group 320).

Subsequently, where the data collecting node 323 receives the encoded data, the data collecting node eliminates interference through MIMO signal processing with respect to the encoded data, the MIMO signal processing indicating signal processing performed in a receiving end of a MIMO system, to obtain data that the data collecting node 323 should receive. Where there is a target node to receive the processed data, excluding the data collecting node 323, the data collecting node 323 may perform MIMO signal processing performed in the receiving end of the MIMO system with respect to the received data and transmit the signal processed data to the target node in the TDMA mode. Here, $Q_2$ of time slots are used. Where the target node is the node 321, the data collecting node 323 performs MIMO signal processing performed in the receiving end of the MIMO system with respect to the received data and transmits the signal processed data to the target node 321 in the TDMA mode. Also, where $Q_2$ is assumed to be 1, a time slot used where the data collecting node 323 transmits the signal processed data to the target node 321 may be k+4.

An operation that the base station 310 transmits the data to at least one node group existing in a cell in the TDMA mode and an operation that the nodes included in the at least one node group transmit/receive the data may be performed in parallel.

The base station 310 may classify a single time slot into a first time slot and a second time slot and transmit the data to the at least one node group using the first time slot and the nodes included in the at least one node group may transmit/receive the data using the second time slot.

The length of the first time slot and the second time slot may be variously determined.

According to an exemplary embodiment, a cooperative multi-antenna communication method is applied to at least one node group located in a boundary of two neighboring cells in a cellular-based communication system. Accordingly, communication quality of the at least one node located in the cell boundary may be improved. Considering only the cell edge, a method for eliminating intra-cell interference without a channel feedback has been described. Considering the cell boundary, a method for eliminating both intra-cell interference and inter-cell interference between cells without a channel feedback will be described referring to FIGS. 4 to 6. Such a method may improve the communication quality between users in the cell boundary.

Figure 4:
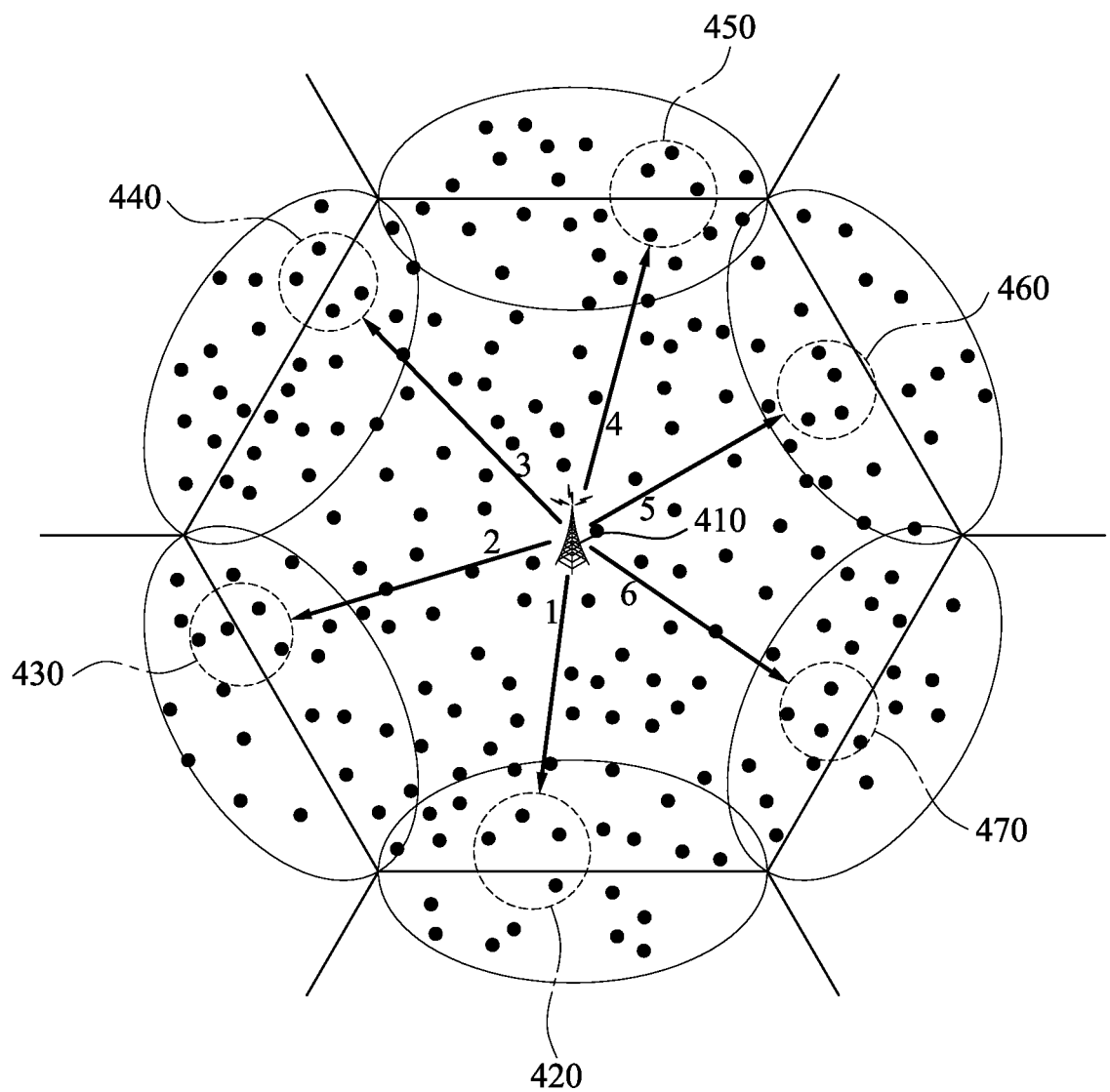
FIG. 4 is a diagram illustrating a base station transmitting data to at least one node group located in a boundary of two neighboring cells according to an exemplary embodiment.

FIG. 4 illustrates that a base station in a cellular-based communication system transmits data to at least one node group located in a boundary of two neighboring cells in a TDMA mode according to an exemplary embodiment.

Referring to FIG. 4, a base station 410 generates a node group using at least one node located in a boundary between a cell where the base station 410 belongs and a neighboring cell. In FIG. 4, an edge of the cell is divided into six regions, and six node groups (1 through 6) 420, 430, 440, 450, 460, and 470 are generated using at least one node located in the boundary between the cell where the base station 410 belongs and the neighboring cell.

The base station 410 and a base station (not shown) of the neighboring cell transmit data to the node groups (1 through 6) 420, 430, 440, 450, 460, and 470 in a TDMA mode. In FIG. 4, since the boundary is divided into six regions, the data may be transmitted based on 6-TDMA mode.

The transmission of the data to the node groups (1 through 6) 420, 430, 440, 450, 460, and 470 performed by the base station 410 and the base station of the neighboring cell, according to an exemplary embodiment, is further described below referring to FIG. 4. The base station 410 and a base station in a neighboring cell of the node group (1) 420 transmit the data to the node group (1) 420 in a k time slot, the base station 410 and a base station in a neighboring cell of the node group (2) 430 transmit the data to the node group (2) 430 in a k+1 time slot, the base station 410 and a base station in a neighboring cell of the node group (3) 440 transmit the data to the node group (3) 440 in a k+2 time slot, the base station 410 and a base station in a neighboring cell of the node group (4) 450 transmit the data to the node group (4) 450 in a k+3 time slot, the base station 410 and a base station in a neighboring cell of the node group (5) 460 transmit the data to the node group (5) 460 in a k+4 time slot, and the base station 410 and a base station in a neighboring cell of the node group (6) 470 transmit the data to the node group (6) 470 in a k+5 time slot. Transmitting of the data to the node groups (1 through 6) 420, 430, 440, 450, 460, and 470 performed by the base station 410 and the base station of the neighboring cell is further illustrated by FIG. 5.

Figure 5:
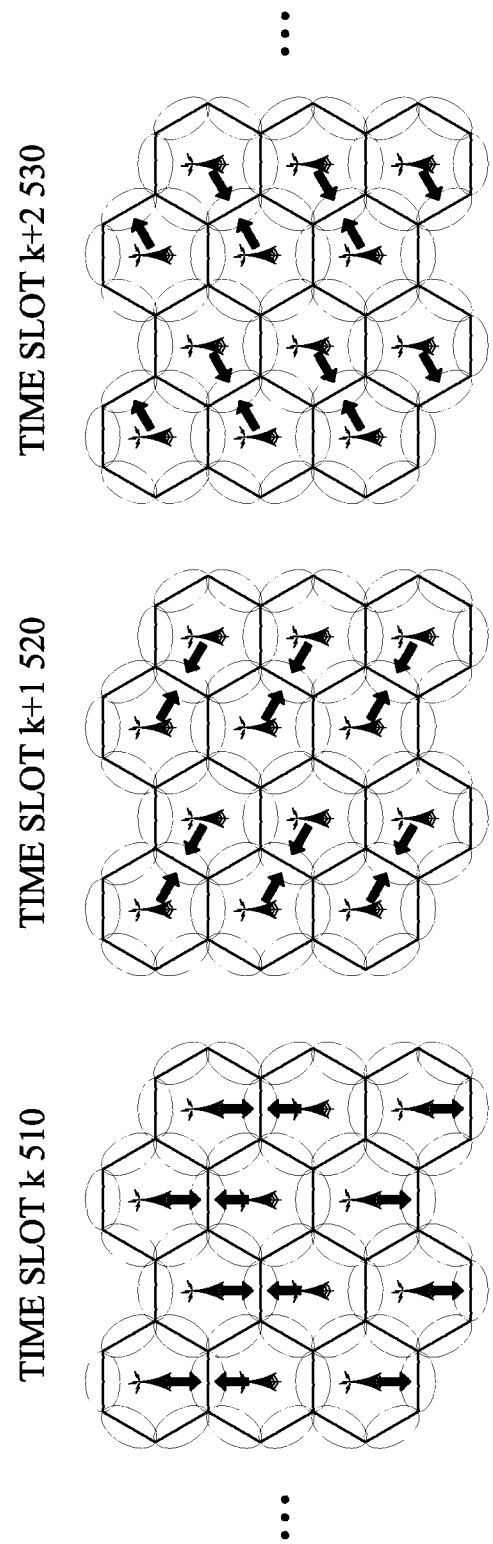
FIG. 5 is a diagram illustrating base stations of two neighboring cells transmitting data to at least one node group according to an exemplary embodiment.

FIG. 5 illustrates that base stations of two neighboring cells in a cellular-based communication system transmit data to at least one node group in a TDMA mode according to an exemplary embodiment.

Referring to FIG. 5, as time varies from k 510 to k+1 520 and to k+3 530, base stations of two neighboring cells change a neighboring side of the cells and transmit data to node groups located in a boundary of the two neighboring cells.

Hereinafter, operations of nodes in a node group located in a boundary between two neighboring cells will be described in detail with reference to FIG. 6.

Figure 6:
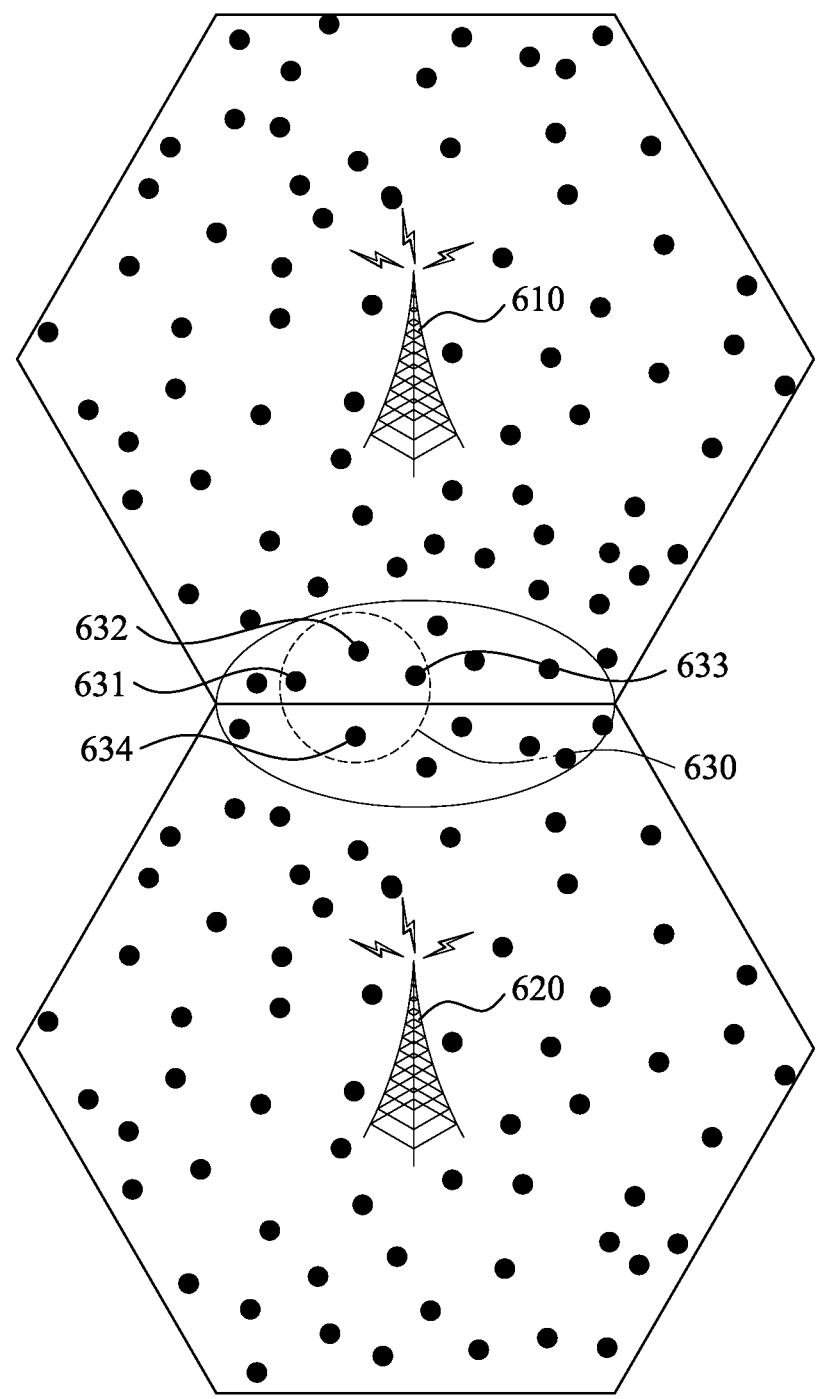
FIG. 6 is a diagram for illustrating operations of nodes in a node group located in a boundary of two neighboring cells according to an exemplary embodiment.

FIG. 6 illustrates operations of nodes in a node group located in a boundary of two neighboring cells in a cellular-based communication system according to an exemplary embodiment.

Referring to FIG. 6, a number of nodes included in a node group 630 may be determined according to a total number of antennas of base stations 610 and 620 in the two neighboring cell. Accordingly, where the number of antennas of each of the base stations 610 and 620 is m, the total number of nodes included in the node group 630 is 2m, and thus 2m×2m of MIMO channels may be generated. In FIG. 6, since the number of antennas of each of the base stations 610 and 620 is assumed to be two, a number of nodes in a node group 630 is determined as four.

Where the base stations 610 and 620 transmit data to the node group 630 in a TDMA mode, at least one node in the node group 630 quantize and encode the data and transmit the encoded data to a data collecting node in the TDMA mode. In this case, where the number of nodes included in the node group 630 is 2m, (2m−1) $Q_1$ of time slots are used. Also, $Q_1$ is determined in quantizing. Where it is assumed that a node 634 is a data collecting node among nodes 631, 632, 633, and 634 in the node group 630, the nodes 631, 632, and 633 quantize and encode the data received from the base stations 610 and 620, and transmit the encoded data to the data collecting node 634 in the TDMA mode. Also, where it is assumed that $Q_1$ is 1 ($Q_1$=1), the time slots used where the nodes 631, 632, and 633 transmit the data to the data collecting node 634 are k+1, k+2, and k+3 (here, it is assumed that the slot k is used where the base stations 610 and 620 transmit data to the node group 630).

Subsequently, where the data collecting node 634 receives the data, the data collecting node eliminates interference through MIMO signal processing with respect to the received data, the MIMO signal processing indicating signal processing performed in a receiving end of a MIMO system, to obtain data that the data collecting node 634 should receive. Where there is a target node to receive the processed data, excluding the data collecting node 634, the data collecting node 634 may perform MIMO signal processing performed in the receiving end of the MIMO system with respect to the encoded data and transmit the signal processed data to the target node in the TDMA mode. Here, $Q_2$ of time slots are used. Where the target node is the node 631, the data collecting node 634 performs MIMO signal processing performed in the receiving end of the MIMO system with respect to the received data and transmits the signal processed data to the target node 631 in the TDMA mode. Also, where $Q_2$ is assumed to be 1, a time slot used where the data collecting node 634 transmits the signal processed data to the target node 631 may be k+4.

An operation that the base stations 610 and 620 transmit the data to at least one node group existing in a cell in the TDMA mode and an operation that the nodes included in the at least one node group transmit/receive the data may be performed in parallel.

The base stations 610 and 620 may classify a single time slot into a first time slot and a second time slot and transmit the data to the at least one node group using the first time slot and the nodes included in the at least one node group may transmit/receive the data using the second time slot.

The length of the first time slot and the second time slot may be variously determined.

Figure 7:
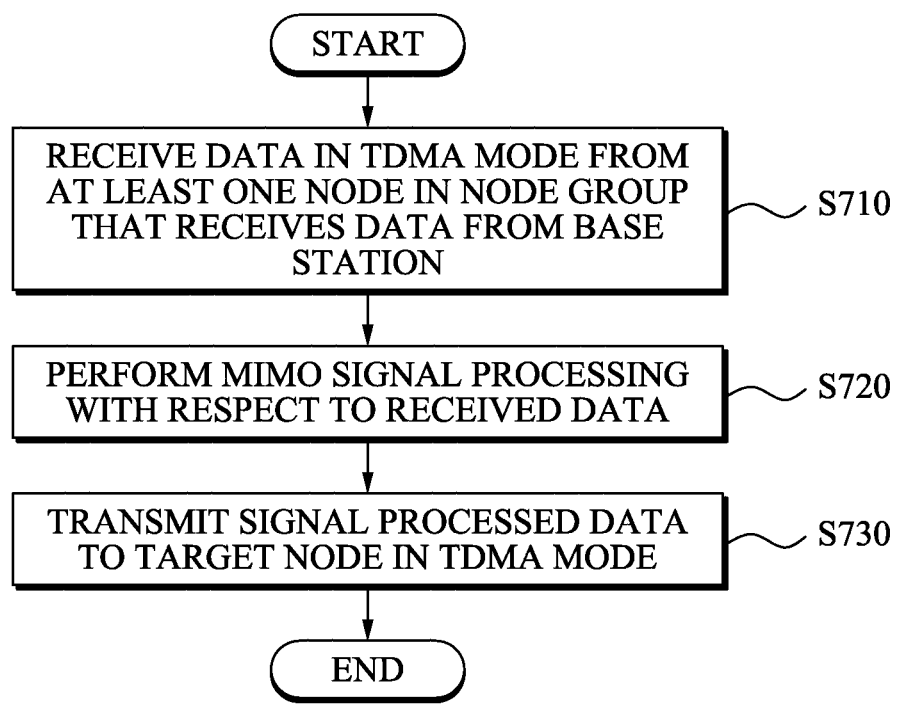
FIG. 7 is a flowchart illustrating a cooperative multi-antenna communication method according to an exemplary embodiment.

FIG. 7 illustrates a cooperative multi-antenna communication method according to an exemplary embodiment.

In operation 710, data is received in a TDMA mode from at least one node included in a node group which receives the data from a base station in a wireless network.

The base station may transmit the data to at least one node group existing in a wireless network in, for example, a TDMA mode.

The at least one node of the node group may quantize and encode the received data, and transmit the encoded data. In this case, where a number of nodes composing the node group is m, (m−1) $Q_1$ of time slots may be used and $Q_1$ may be determined in quantizing.

The number of nodes composing the node group may be determined according to a number of antennas of the base station. Where the number of antenna of the base station is m, m×m of cooperative multi-antenna channels may be generated.

In operation S720, MIMO signal processing is performed with respect to the data received from the operation S710, the MIMO signal processing indicating a signal processing performed in a receiving end of a MIMO system.

In operation S730, where there is at least one target node to receive the signal processed data from the operation S720, the signal processed data is transmitted to the at least one target node in the TDMA mode.

The base station may classify a single time slot into a first time slot and a second time slot and transmit the data to at least one node group using the first time slot and nodes in the at least one node group may transmit/receive the data using the second time slot.

The length of the first time slot and the second time slot may be variously determined.

The wireless network may be a cellular-based communication system, and in this case, a node group may be either a group of at least one of node existing in an edge of a cell or a group of at least one node existing in a boundary of two neighboring cells. Where the node group is the group of at least one node existing in the boundary of two neighboring cells, nodes in the node group may receive data from base stations of the two neighboring cells and a number of the nodes may be determined according to a total number of antennas of the base stations in the neighboring cells.

Figure 8:
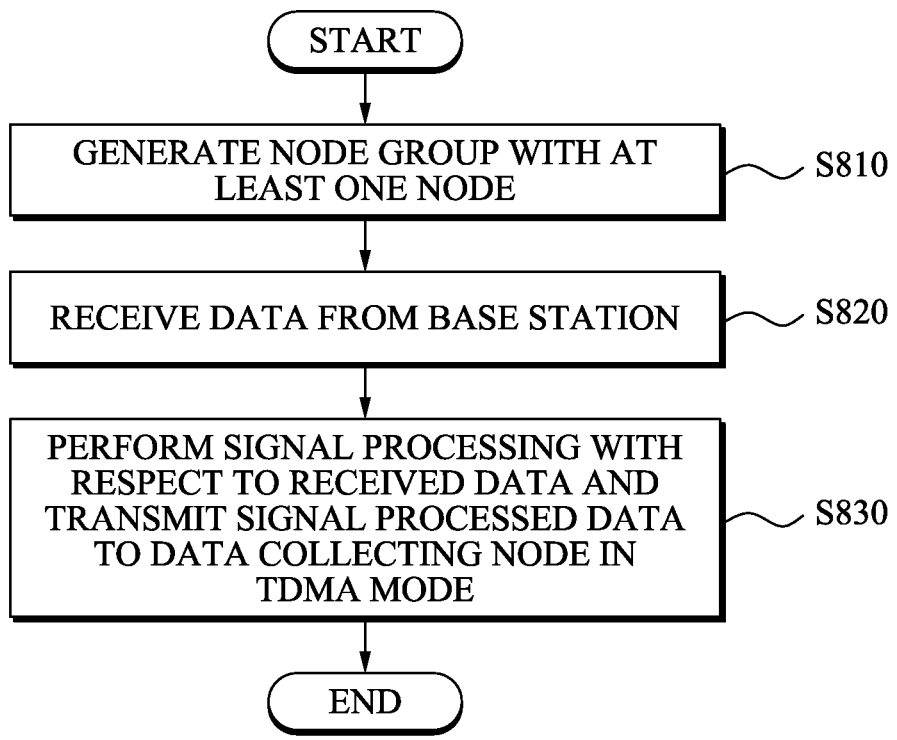
FIG. 8 is a flowchart illustrating a cooperative multi-antenna communication method according to another exemplary embodiment.

FIG. 8 illustrates a cooperative multi-antenna communication method according to another exemplary embodiment.

In operation S810, a node group is generated with at least one node in a wireless network.

The wireless network may be a cellular-based communication system, and in this case, in the operation S810, either a node group with at least one node in a cell edge or a node group with at least one node in a boundary between two neighboring cells may be generated.

In operation S820, data is received from a base station.

A number of nodes in the node group may be determined according to a number of antennas of the base station.

The base station may transmit data to at least one node group existing in the wireless network in a TDMA mode.

Where the wireless network is a cellular-based communication system and the node group is generated with the at least one node in the boundary between two neighboring cells, nodes in the node group may receive data from base stations of the two neighboring cells and a number of the nodes may be determined according to a total number of antennas of the base stations in the neighboring two cells.

In operations S830, signal processing is performed with respect to the received data from the operation S820 and the signal processed data is transmitted to a data collecting node in the node group in the TDMA mode.

In the operation S830, received data from the operation S820 may be quantized and encoded, and the encoded data may be transmitted to the data collecting node.

The data collecting node may receive the encoded data from at least one node in the node group, eliminate interference through a MIMO signal processing performed in a receiving end of a MIMO system, and obtain data that the data collecting node should receive. Where there is at least one target node to receive the processed data in the node group, excluding the data collecting node, the data collecting node may perform MIMO signal processing performed in the receiving end of the MIMO system with respect to the received data and transmit the signal processed data to the at least one target node in a TDMA mode.

The base station may classify a single time slot into a first time slot and a second time slot and transmit data to at least one node group existing in the wireless network using the first time slot and nodes in the at least one group may transmit the data using the second time slot.

The length of the first time slot and the second time slot may be variously determined.

Figure 9:
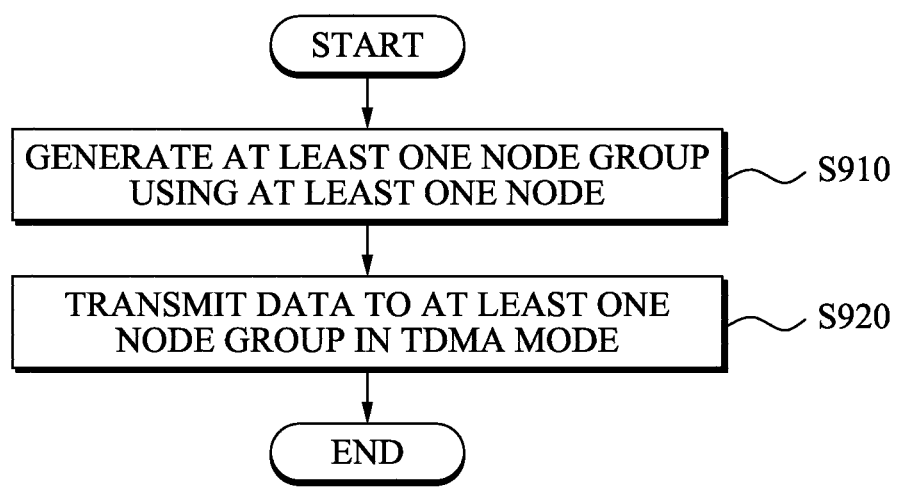
FIG. 9 is a flowchart illustrating a cooperative multi-antenna communication method according to still another exemplary embodiment.

FIG. 9 illustrates a cooperative multi-antenna communication method according to another exemplary embodiment.

In operation S910, at least one node group is generated using at least one node in the wireless network.

The wireless network may be a cellular-based communication system, and in this case, the at least one node group may be generated using at least one node in a cell edge.

A number of nodes included in the at least one node group may be determined according to a number of antennas of the base station.

In operation S920, data is transmitted in a TDMA mode to the at least one node group generated in the operation S910.

At least one node included in the at least one node group that receives the data in the operation S920 may transmit the data to a data collecting node in the TDMA mode, and the data collecting node may eliminate interference through MIMO signal processing performed in a receiving end of a MIMO system to obtain data that the collecting node should receive. Where there is at least one target node to receive the processed data in the at least one node group, excluding the data collecting node, the data collecting node performs MIMO signal processing with respect to the data, and transmits the processed data to the at least one target node.

A single time slot may be classified into a first time slot and a second time slot and the operation S920 may be performed using the first time slot and nodes in the at least one node group may transmit/receive the data using the second time slot.

The length of the first time slot and the second time slot may be variously determined.

The methods and operations described above may be recorded, or fixed in one or more computer-readable media that includes program instructions to be implemented by a computer to case a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of cooperative multi-antenna communication of a data collecting node, the method comprising:
   receiving data from at least one node of a node group that receives data from a base station;
   performing multiple input multiple output (MIMO) signal processing on the received data, the MIMO signal processing indicating signal processing performed in a receiving end of a MIMO system, and the MIMO signal processing being performed to remove interference from a signal destined for at least one target node other than the data collecting node; and
   transmitting the MIMO signal processed data with interference removed to the at least one target node.

2. The method of claim 1, wherein the receiving comprises receiving the data in a time division multiple access (TDMA) mode from the at least one node of the node group that receives the data from the base station in a wireless network.

3. The method of claim 2, wherein the wireless network is a cellular-based communication system and the node group is a grouping of at least one node located in an edge of a cell.

4. The method of claim 2, wherein the wireless network is a cellular-based communication system and the node group is a grouping of at least one node located in a boundary between a cell where the base station belongs and a neighboring cell.

5. The method of claim 4, wherein the node group receives the data from the base station and a second base station located in the neighboring cell.

6. The method of claim 1, wherein a number of nodes composing the node group is determined according to a number of antennas in the base station.

7. The method of claim 5, wherein a number of the nodes composing the node group is determined according to a number of antennas in the base station and the second base station.

8. The method of claim 2, wherein the base station classifies a single time slot into a first time slot and a second time slot and transmits the data to the node group using the first time slot, and nodes composing the node group transmit/receive the data using the second time slot.

9. A method of cooperative multi-antenna communication, the method comprising:
receiving data from a base station;
encoding the received data; and
transmitting the encoded data to a data collecting node existing in a node group,
wherein the data collecting node receives the encoded data from at least one node existing in the node group, performs MIMO signal processing on the encoded data, the MIMO signal processing indicating signal processing performed in a receiving end of a MIMO system, and the MIMO signal processing being performed to remove interference from a signal destined for at least one target node other than the data collecting node, and the data collecting node transmits the MIMO signal processed data with the interference removed to the at least one target node.

10. The method of claim 9, wherein the receiving comprises receiving the data from a base station in a wireless network in a time division multiple access (TDMA) mode.

11. The method of claim 10, further comprising generating the node group with the at least one node in the wireless network, wherein the wireless network is a cellular-based communication system and the generating of the node group comprises generating the node group with the at least one node located in an edge of a cell.

12. The method of claim 10, further comprising generating the node group with the at least one node in the wireless network, wherein the wireless network is a cellular-based communication system, and the generating of the node group comprises generating the node group with the at least one node located in a boundary between a cell where the base station belongs and a neighboring cell.

13. The method of claim 12, wherein the receiving of the data from the base station comprises receiving the data from the base station and a second base station located in the neighboring cell.

14. The method of claim 10, wherein a number of nodes composing the node group is determined according to a number of antennas in the base station.

15. The method of claim 13, wherein a number of nodes composing the node group is determined according to a number of antennas in the base station and the second base station.

16. The method of claim 10, wherein the base station classifies a single time slot into a first time slot and a second time slot and transmits the data to the node group using the first time slot, and nodes composing the node group transmit/receive the signal processed data using the second time slot.

17. A method of cooperative multi-antenna communication, the method comprising:
generating at least one node group using at least one node existing in a wireless network; and
transmitting data to the at least one node group in a time division multiple access (TDMA) mode,
wherein the at least one node in the at least one node group transmits the data to a data collecting node of each node group in the TDMA mode, and the data collecting node performs MIMO signal processing on the received data, the MIMO signal processing indicating signal processing performed in a receiving end of a MIMO system, and the MIMO signal processing being performed to remove interference from a signal destined for at least one target node other than the data collecting node, and the data collecting node transmits the MIMO signal processed data with the interference removed to the at least one target node.

18. The method of claim 17, wherein the wireless network is a cellular-based communication system, and the generating of the at least one node group comprises generating the at least one node group using the at least one node located in an edge of a cell.

19. The method of claim 17, wherein the generating of the at least one node group comprises determining a number of nodes to be included in the at least one node group according to a number of antennas of the base station.

20. The method of claim 17, wherein:
the transmitting of the data in the TDMA mode comprises transmitting the data to the at least one node group using a first time slot after classifying a single time slot into the first time slot and a second time slot, and
nodes included in the at least one node group transmit/receive the data using the second time slot.

21. A non-transitory computer-readable storage medium storing a program to operate a cooperative multi-antenna communication system, comprising instructions to cause a computer to:
receive data from at least one node of a node group that receives data from a base station;
perform multiple input multiple output (MIMO) signal processing on the received data, the MIMO signal processing indicating signal processing performed in a receiving end of a MIMO system, and the MIMO signal processing being performed to remove interference from a signal destined for at least one target node other than the data collecting node; and
transmit the signal processed data with the interference removed to the at least one target node.

22. A non-transitory computer-readable storage medium storing a program to operate a cooperative multi-antenna communication system, comprising instructions to cause a computer to:
receive data from a base station;
encode the received data; and
transmit the encoded data to a data collecting node existing in a node group,
wherein the data collecting node receives the encoded data from at least one node existing in the node group, performs MIMO signal processing on the encoded data, the MIMO signal processing indicating signal processing performed in a receiving end of a MIMO system, and the MIMO signal processing being performed to remove interference from a signal destined for at least one target node other than the collecting node, and the data collecting node transmits the MIMO signal processed data with the interference removed to at least one target node.

23. A non-transitory computer-readable storage medium storing a program to operate a cooperative multi-antenna communication system, comprising instructions to cause a computer to:
generate at least one node group using at least one node existing in a wireless network; and transmit data to the at least one node group in a time division multiple access (TDMA) mode, wherein the at least one node in the at least one node group transmits the data to a data collecting node of each node group in the TDMA mode, and the data collecting node performs MIMO signal processing on the received data, the MIMO signal processing indicating signal processing performed in a receiving end of a MIMO system, and the MIMO signal processing being performed to remove interference from a signal destined for at least one target node other than the data collecting node, and the data collecting node transmits the MIMO signal processed data with the interference removed to the at least one target node.

24. A system of cooperative multi-antenna communication network, the system comprising:
    a node group having a plurality of nodes represented by a positive integer m, among the plurality of nodes, the node group having at least one data collecting node and at least one target node; and
    a base station in a first domain, the base station in the first domain having a plurality of antenna and transmitting data to at least some of the plurality of nodes in the node group;
    wherein
        the node group determines the at least one data collecting node;
        at least some of the plurality of nodes receiving data transmitted by the base station in the first domain, each of the plurality of nodes that received data quantizes and encodes the data received from the base station in the first domain, and transmits encoded data to the at least one data collecting node; and
        the at least one data collecting node receives the encoded data, performs MIMO signal processing so as to obtain processed data from which interference is substantially eliminated, and the MIMO signal processing being performed for at least one target node other than the at least one data collecting node to remove interference from a signal destined for the at least one target node, and transmits the processed data with the interference removed to the at least one target node.

25. A system of cooperative multi-antenna communication network, the system comprising:
    a node group having a plurality of nodes represented by a positive integer m, among the plurality of nodes, the node group having at least one data collecting node and at least one target node;
    a base station in a first domain, the base station in the first domain having a plurality of antenna and transmitting data to at least some of the plurality of nodes in the node group; and
    a base station in a neighboring domain, the base station in the neighboring domain having a plurality of antenna and transmitting data to the node group such that the data quantized, encoded and transmitted to the data collecting node includes data received from the base station in the first domain and second base station in the neighboring domain;
    wherein
    the node group determines the at least one data collecting node,
    at least some of the plurality of nodes receiving data transmitted by the base station in the first domain, each of the plurality of nodes that received data quantizes and encodes the data received from the base station in the first domain, and transmits encoded data to the at least one data collecting node, and
    m is determined by an aggregate number of antenna on the base station in the first domain and the base station in the neighboring domain.

26. The system of cooperative multi-antenna communication network according to claim 25, wherein at least one node of the node group is within the first domain and at least one node of the node of the node group is within the neighboring domain.

27. The system of cooperative multi-antenna communication network according to claim 25, wherein at least one node of the node group is in a boundary between the first domain and the neighboring domain.

* * * * *